UNITED STATES PATENT OFFICE.

HEINRICH PHILIPP HERMANN, OF KRONBERG, GERMANY, ASSIGNOR TO KUNST-PLASTIK-GESELLSCHAFT MIT BESCHRÄNKTER HAFTUNG, OF FRANKFORT-ON-THE-MAIN, GERMANY.

COMPOSITION OF MATTER FOR FORMING PLASTIC WALL-COVERINGS.

1,007,199.     Specification of Letters Patent.     Patented Oct. 31, 1911.

No Drawing. Original application filed March 18, 1909, Serial No. 484,251. Divided and this application filed March 23, 1910. Serial No. 551,134.

*To all whom it may concern:*

Be it known that I, HEINRICH PHILIPP HERMANN, a subject of the Emperor of Germany, residing at 31 Eichenstrasse, Kronberg, i. Taunus, Germany, have invented certain new and useful Improvements in Compositions of Matter for Forming Plastic Wall-Coverings, of which the following is a specification.

The present application is a division of my application for Letters Patent in the U. S. Patent Office, filed March 18, 1909, Serial No. 484,251.

My invention relates to a composition of matter suitable for forming a plastic mass to be applied to walls and other surfaces, when it is desired to produce designs in relief on said plastic masses.

The object of the present invention is the production of a plastic mass which when applied to a rough plastered wall, or other surface, will form an excellent surface on which to produce relief designs by means of covers bearing negatives of the designs which it is desired to produce, according to the process described in my said prior application, by virtue of the fact that the mass will admit of the reproduction of the very finest details of the design, and will ultimately set to a hard mass with a smooth finish.

The process of providing surfaces with coatings bearing designs in relief, according to my said prior application, consists in applying a coating of a suitable plastic composition to the surface, such as a wall, ceiling or the like which it is desired to cover, and then impressing the said coating with the desired design by means of covers provided on one side with the negative of the said design.

This process is of particular importance in the case of rough plastered walls, as the coating can be applied directly on the rough-cast surface, so that the usual finishing plaster coat may be dispensed with.

For the purposes of this invention only a composition can be employed which is tenacious, does not yield laterally, and which is adapted to receive the impression of all the details of the design. The entire composition becomes completely hardened throughout within 24 hours of the time of application to a wall or other surface.

According to my invention, a composition suitable for application to rough plastered walls may consist of a mixture of Portland cement, plaster of Paris, and sand, and an adhesive for promoting the cohesion of the substances with one another and with the ground, consisting of resin and dextrin. Powdered coloring matter may be mixed with the basic materials, being chosen according to the color or tint desired in the finished surfaces.

Example: About 154 parts of Portland cement, 30 parts of plaster of Paris, 96 parts of sand, and 30 parts of powdered coloring matter are thoroughly mixed together. One part of resin and 15 parts of dextrin are added to the mixture. All the materials which are not already in fine powder must be previously ground to a fine powder. This composition is stirred up with either cold, warm, or boiling water at the place of use. A coat of composition thus produced can withstand shock, and the action of air, water and heat. It may also be provided with a covering such as, for example, a covering of lac or varnish, but can be washed without such covering.

Hitherto plastic compositions for purposes analogous to those of the present invention could only be manufactured in the moist condition, so that they had to be composed immediately before they were used. It was therefore difficult to ship them. The composition according to the present invention is adapted to remain perfectly dry and pulverized, so that it may be shipped in bags, and it is only necessary to mix it up with cold or warm water at the place of use.

I claim:

1. A composition of matter for forming plastic wall coverings, comprising cement, plaster of Paris, sand, resin and dextrin.

2. A composition of matter for forming plastic wall coverings, consisting of cement, plaster of Paris, sand, powdered coloring matter, resin and dextrin.

3. A composition of matter for forming plastic wall coverings, consisting of cement, plaster of Paris, sand, powdered coloring matter, and an adhesive consisting of one part resin and 15 parts dextrin.

4. A composition of matter for forming plastic wall coverings, comprising substantially 154 parts cement, 30 parts plaster of Paris, 96 parts sand, mixed with relatively small quantities of an adhesive consisting of resin and dextrin.

5. A composition of matter for forming plastic wall coverings, consisting of substantially 154 parts cement, 30 parts plaster of Paris, 96 parts sand, 30 parts powdered coloring matter, mixed with an adhesive consisting of resin and dextrin.

6. A composition of matter for forming plastic wall coverings consisting of the following ingredients and compounded in the following proportions, to wit; 154 parts cement, 30 parts plaster of Paris, 96 parts sand, 30 parts powdered coloring matter, one part resin, and 15 parts dextrin, substantially as described.

7. A composition of matter for forming plastic wall coverings, comprising 154 parts cement, 30 parts plaster of Paris, 96 parts sand, one part resin, and 15 parts dextrin.

In testimony whereof I affix my signature in presence of two witnesses.

HEINRICH PHILIPP HERMANN.

Witnesses:
WALTER STERN,
JEAN GRUND.

Copies of this patent may be obtained for five cents each, by addressing the "Commissioner of Patents, Washington, D. C."